(12) United States Patent
Ema et al.

(10) Patent No.: US 10,447,081 B2
(45) Date of Patent: Oct. 15, 2019

(54) SECONDARY COIL MODULE

(71) Applicant: HOSIDEN CORPORATION, Osaka (JP)

(72) Inventors: Hiroshi Ema, Osaka (JP); Fumio Ohta, Osaka (JP); Eiji Sato, Osaka (JP)

(73) Assignee: Hosiden Corporation, Osaka (JP)

( * ) Notice: Subject to any disclaimer, the term of this patent is extended or adjusted under 35 U.S.C. 154(b) by 128 days.

(21) Appl. No.: 15/569,316

(22) PCT Filed: Mar. 2, 2016

(86) PCT No.: PCT/JP2016/056391
§ 371 (c)(1),
(2) Date: Oct. 25, 2017

(87) PCT Pub. No.: WO2016/174918
PCT Pub. Date: Nov. 3, 2016

(65) Prior Publication Data
US 2018/0123394 A1 May 3, 2018

(30) Foreign Application Priority Data
Apr. 30, 2015 (JP) .................................. 2015-093359

(51) Int. Cl.
*H02J 7/00* (2006.01)
*H02J 50/10* (2016.01)
(Continued)

(52) U.S. Cl.
CPC ................ *H02J 50/10* (2016.02); *H01F 1/12* (2013.01); *H01F 3/06* (2013.01); *H01F 5/04* (2013.01);
(Continued)

(58) Field of Classification Search
CPC ........ H02J 50/10; H02J 7/0027; H02J 7/0044; H02J 7/025; H01F 1/12; H01F 3/06;
(Continued)

(56) References Cited

U.S. PATENT DOCUMENTS 7,914,442 B1 * 3/2011 Gazdzinski ........ A61B 1/00009
600/109
8,068,897 B1 * 11/2011 Gazdzinski ........ A61B 1/00016
600/109
(Continued)

FOREIGN PATENT DOCUMENTS

CN 102957214 A 3/2013
CN 102957214 B 11/2015
(Continued)

OTHER PUBLICATIONS

Keiichi, Japanese Patent Document No. JP-2012-157219, published Aug. 12, 2012, machine translated by JPO website on Apr. 13, 2019, 11 pages. (Year: 2012).*
(Continued)

*Primary Examiner* — Phallaka Kik
(74) *Attorney, Agent, or Firm* — Dilworth & Barrese, LLP

(57) ABSTRACT

There is provided a secondary coil module receiving supply of electric power via a primary coil by contactless power transfer technique. The secondary coil module includes a core formed of magnetic material, the core having a tubular portion in the form of a tube and a bottom portion formed integral with the tubular portion in such a manner as to close an opening of the tubular portion formed at one axial end portion thereof, a storage battery accommodated within an accommodation space provided inside the tubular portion and configured to be charged by the power via the primary
(Continued)

coil and a coil winding disposed outside the core and on the side of the bottom portion of the core.

13 Claims, 4 Drawing Sheets

(51) Int. Cl.
| | | |
|---|---|---|
| H01F 1/12 | (2006.01) | |
| H01F 3/06 | (2006.01) | |
| H01F 5/04 | (2006.01) | |
| H01M 2/10 | (2006.01) | |
| H01M 10/44 | (2006.01) | |
| H01M 10/46 | (2006.01) | |
| H04B 5/00 | (2006.01) | |
| H02J 7/02 | (2016.01) | |
| H01F 3/00 | (2006.01) | |

(52) U.S. Cl.
CPC ............ *H01M 2/10* (2013.01); *H01M 10/44* (2013.01); *H01M 10/46* (2013.01); *H02J 7/0027* (2013.01); *H02J 7/0044* (2013.01); *H02J 7/025* (2013.01); *H04B 5/0037* (2013.01); *H01F 2003/005* (2013.01)

(58) Field of Classification Search
CPC ...... H01F 5/04; H01F 2003/005; H01M 2/10; H01M 10/44; H01M 10/46; H04B 5/0037
USPC .......................................... 320/108, 113, 115
See application file for complete search history.

(56) References Cited

U.S. PATENT DOCUMENTS

| | | | | |
|---|---|---|---|---|
| 2004/0108395 A1* | 6/2004 | Hamada | ................ | F02M 51/005 239/585.1 |
| 2005/0030198 A1* | 2/2005 | Hudson | ................ | G01V 11/002 340/854.3 |
| 2008/0061733 A1 | 3/2008 | Toya | | |
| 2008/0180092 A1* | 7/2008 | Fukushima | ............ | G01D 5/208 324/207.16 |
| 2009/0140691 A1 | 6/2009 | Jung | | |
| 2012/0071710 A1* | 3/2012 | Gazdzinski | ........ | A61B 1/00016 600/101 |
| 2014/0117929 A1* | 5/2014 | Lang | ...................... | B62K 19/30 320/108 |
| 2015/0123761 A1* | 5/2015 | Winkler | .................... | H01F 3/08 336/221 |
| 2015/0213942 A1* | 7/2015 | Kuroda | ..................... | H01F 3/10 336/178 |
| 2015/0214774 A1 | 7/2015 | Ema et al. | | |
| 2015/0357828 A1 | 12/2015 | Ichikawa et al. | | |

FOREIGN PATENT DOCUMENTS

| | | |
|---|---|---|
| EP | 2899830 A2 | 7/2015 |
| JP | H-07201577 A | 8/1995 |
| JP | 2006324419 A | 11/2006 |
| JP | 2008-48482 A | 2/2008 |
| JP | 2009-136133 A | 6/2009 |
| JP | 2011-096737 A | 5/2011 |
| JP | 2012-157219 A | 8/2012 |
| JP | 2013-196883 A | 9/2013 |
| JP | 2014-017920 A | 1/2014 |
| JP | 2014-017920 A | 9/2014 |
| WO | 2014/125596 A1 | 8/2014 |

OTHER PUBLICATIONS

Chun-kil, Japanese Patent Document No. JP-2009-136133, published Jun. 18, 2009, machine translated by JPO website on Apr. 13, 2019, 29 pages. (Year: 2009).*
Shoichi, Japanese Patent Document No. JP-2008-048482, published Feb. 29, 2008, machine translated by JPO website on Apr. 13, 2019, 26 pages. (Year: 2008).*
Chinese Office Action dated Jan. 28, 2019.
Decision of Refusal from Japanese Patent Office dated Nov. 27, 2018.
English translation of International Prelimiary Report on Patentability dated Nov. 9, 2017 (Forms PCT/ISA/237, PCT/IB/373 and PCT/IB/338).
European Search Report from EP16786195.4 dated Dec. 3, 2018.

* cited by examiner

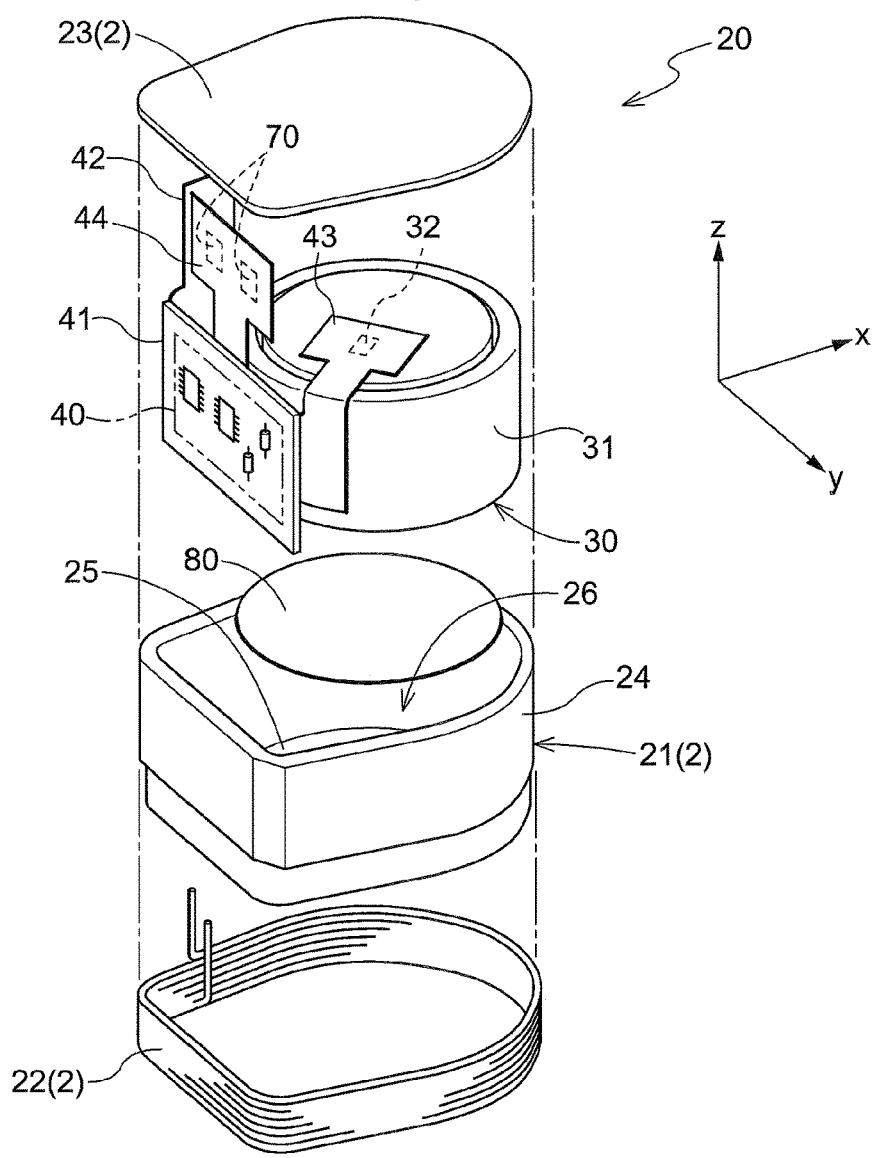
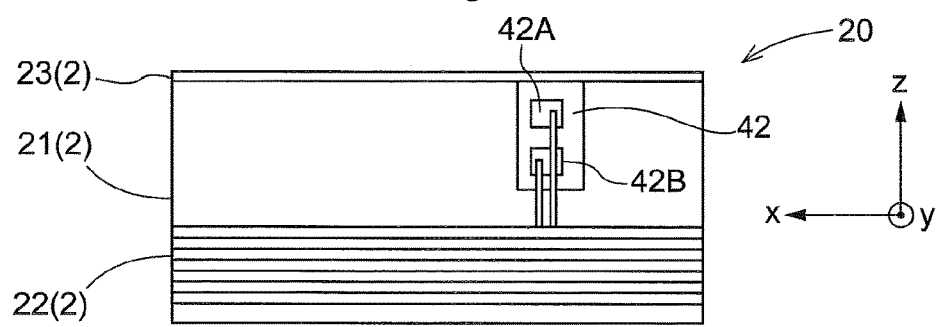

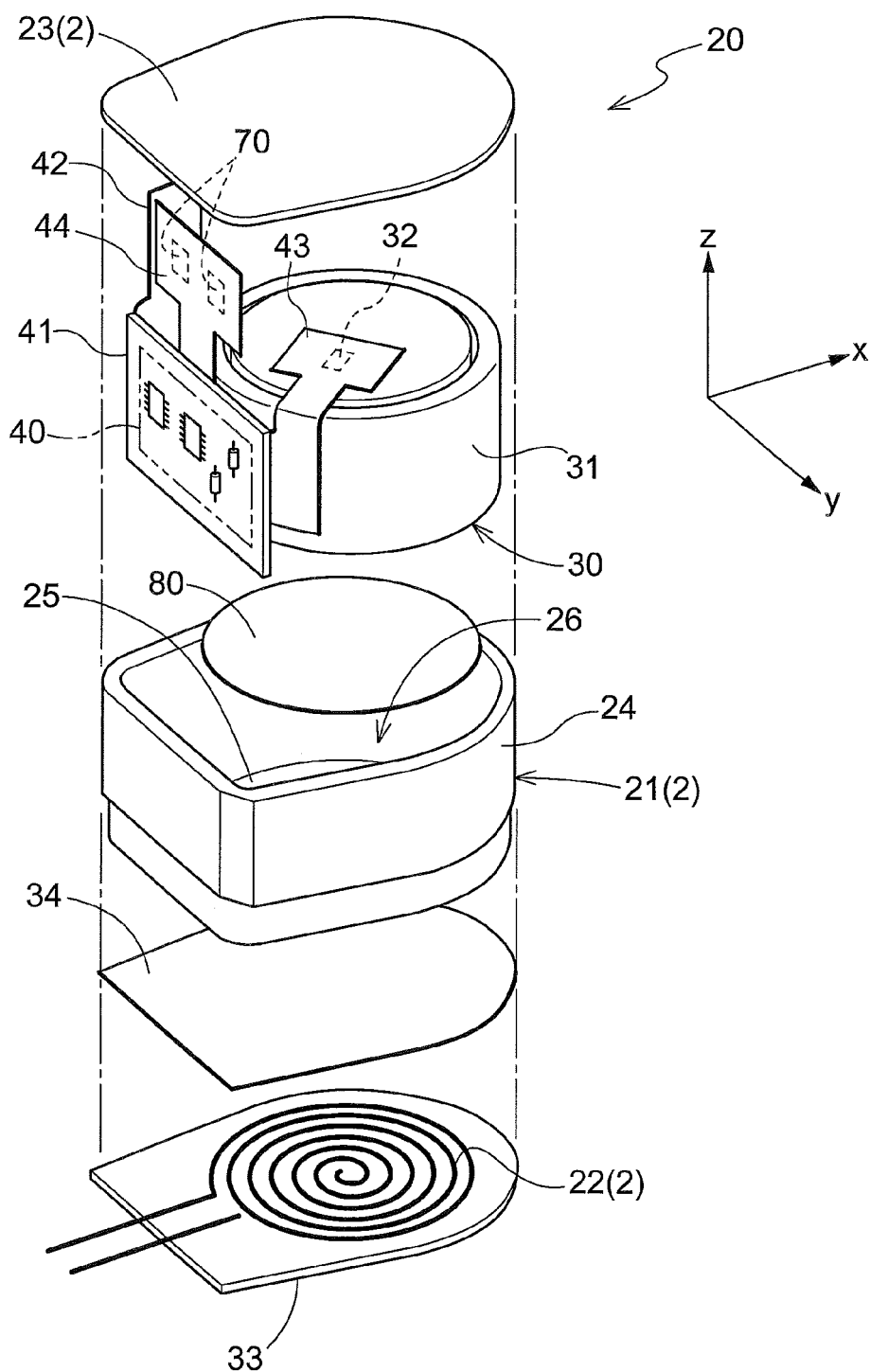

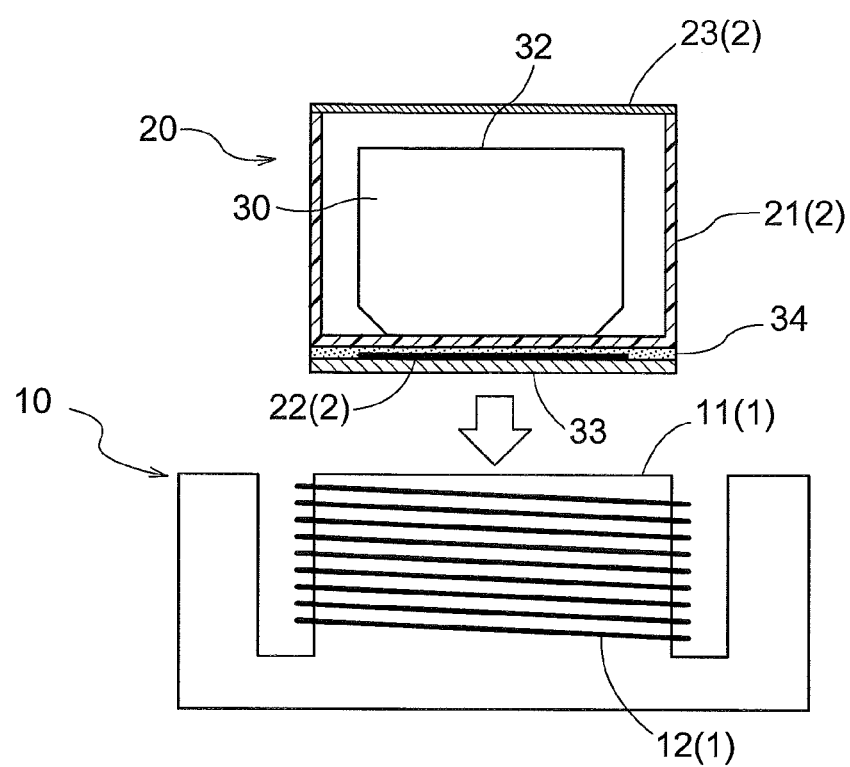

SECONDARY COIL MODULE

TECHNICAL FIELD

The present invention relates to a secondary coil module receiving supply of electric power via a primary coil by contactless power transfer technique.

RELATED ART

Conventionally, there has been used a contactless power transfer (non-contact power transfer) technique configured to supply power to a storage battery incorporated in a terminal device without contact between the terminal device and a charging station via terminals. As some examples of such contactless power transfer technique, there are known e.g. electromagnetic induction technique, radio wave technique, and electromagnetic field resonance technique. In the case of the electromagnetic induction technique, a secondary coil is provided on a terminal device side and a primary coil is provided on a charging station side. For power supply (transfer) from the charging station to the terminal device, the charging station and the terminal device will be arranged in such a manner to dispose the primary coil and the secondary coil in opposition to each other. In this state, as a current is supplied to the primary coil, a magnetic flux is generated in this primary coil. And, this magnetic flux generates an electromotive force in the secondary coil by the electromagnetic induction, which in turn supplies power to a storage (rechargeable) battery. An exemplary technique relating to such magnetic induction technique is known from Patent Document 1.

A secondary battery module described in Patent Document 1 is configured such that a secondary battery, a charging control circuit and a control circuit board are accommodated in a case body. The charging control circuit includes a power receiving coil and a resonance capacitor. The secondary battery and the power receiving coil are disposed in opposition to each other via a ferrite sheet and a shock absorber.

PRIOR-ART DOCUMENT

Patent Document

Patent Document 1: Japanese Unexamined Patent Application No. 2013-196883

SUMMARY

Problem to be Solved by Invention

In the technique disclosed in Patent Document 1, the power receiving coil and the secondary battery are accommodated within a single case body and disposed in opposition to each other via a ferrite sheet and a shock absorber. As shown in FIG. 1 in Patent Document 1, the ferrite sheet is configured to form a gap relative to an inner wall face of the case body. For this reason, if leakage magnetic flux is generated in this gap and an alternating magnetic field due to this leakage magnetic flux reaches the secondary battery, eddy current may be generated in e.g. terminal electrodes and/or a metal casing of the secondary battery. And, this eddy current may lead to heat generation in the secondary battery.

In view of the above, there is a need for a secondary coil module capable of suppressing heat generation in a storage battery at the time of charging of this battery by the contactless power transfer technique.

Solution

According to a characterizing feature of a secondary coil module relating to the present invention, there is provided a secondary coil module receiving supply of electric power via a primary coil by contactless power transfer technique, the secondary coil module comprising:

a core formed of magnetic material, the core having a tubular portion in the form of a tube and a bottom portion formed integral with the tubular portion in such a manner as to close an opening of the tubular portion formed at one axial end portion thereof;

a storage battery accommodated within an accommodation space provided inside the tubular portion and configured to be charged by the power; and a coil winding disposed outside the core and on the side of the bottom portion of the core.

The above-described characterizing arrangement can avoid formation of any gap between the tubular portion and the bottom portion, which portion is present on the disposing side of the coil winding in the core. Thus, it becomes possible to increase magnetism collecting effect for the magnetic flux generated from the primary coil of the core. Therefore, power transfer efficiency from the primary coil to the secondary coil module can be increased. Further, with the avoidance of gap formation, it becomes also possible to reduce leakage magnetic flux due to magnetic field generated between the primary coil and the coil winding. Therefore, even if the terminal electrodes and the case of the storage battery are formed of metallic material, it is still possible to suppress heat generation in the battery due to eddy current resulting from the leakage magnetic flux.

Preferably, the other axial end portion of the tubular portion of the core is opened, which other axial end portion in turn is closed with a lid member formed of magnetic material.

The above arrangement allows covering of the inside space (accommodation space) of the tubular portion of the core. As a result, damage to the components accommodated within the core can be suppressed and leakage of magnetic flux to the outside can be suppressed also.

Preferably, the coil winding is wound in a spiral form to surround the tubular portion.

With the above arrangement, since the coil winding is wound around the core collecting magnetic flux from the primary coil, the electromotive force generated in the secondary coil can be increased. Therefore, the power transfer efficiency from the primary coil to the secondary coil module can be further enhanced.

Alternatively, the coil winding can be wound in a swirl form and disposed in opposition to the bottom portion of the core.

With the above arrangement, the height of the coil winding can be reduced, whereby the disposing space of the coil winding can be reduced correspondingly. Therefore, the secondary coil module can be formed compact.

Preferably, the core is formed of resin containing soft magnetic material.

With the above arrangement, with forming of the core by resin molding technique, formation of gap between the tubular portion and the bottom portion can be avoided. Therefore, a core having superior magnetic characteristics can be fabricated easily.

Preferably, the accommodation space further accommodates a power storage control circuit for controlling charging of the storage battery.

With the above arrangement, the power storage control circuit can be protected from exposure to magnetic field. Therefore, occurrence of an erroneous action, damage or deterioration, etc. of the power storage control circuit due to magnetic field can be suppressed.

BRIEF DESCRIPTION OF DRAWINGS

FIG. 1 is a view showing a secondary coil module,

FIG. 2 is a side view of the secondary coil module,

FIG. 6 is a view showing a secondary coil module relating to a further embodiment, and FIG. 7 is a view showing a charging mode of the secondary coil module relating to the further embodiment.

EMBODIMENT

An embodiment of a secondary coil module relating to the present invention will be explained. The secondary coil module is provided on a terminal side unit of a charger system of the contactless power transfer type including a charging station side unit and a terminal side unit. The secondary coil module is configured to be capable of suppressing heat generation at the time of charging of a storage battery provided in the terminal side unit. Next, a secondary coil module 20 according to the instant embodiment will be explained.

Figure 3:
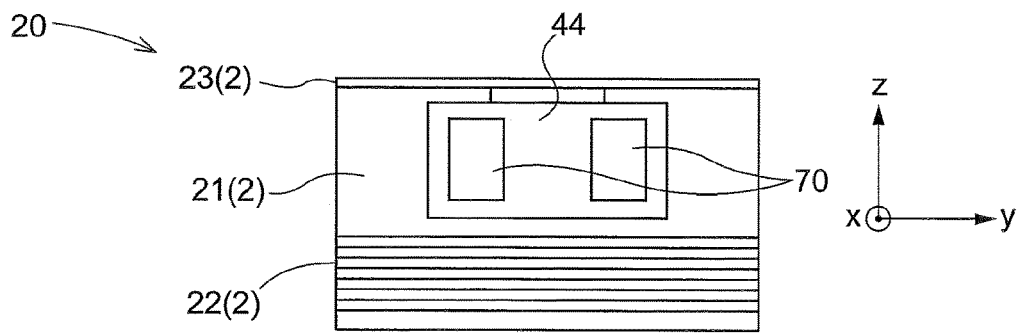
FIG. 3 is another side view of the secondary coil module.

FIG. 1 shows an exploded perspective view of the secondary coil module 20. FIG. 2 is a side view showing the secondary coil module 20 as seen along a y-direction in FIG. 1. FIG. 3 is another side view showing the secondary coil module 20 as seen along an x-direction in FIG. 1. Further, FIG. 4 shows a charging mode of the storage battery 30 provided in the secondary coil module 20.

Figure 4:
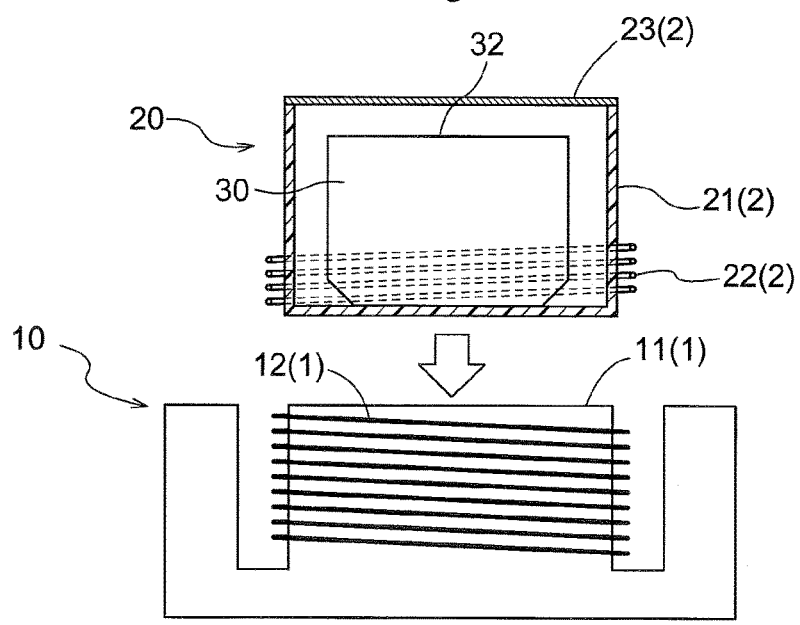
FIG. 4 is a view showing a charging mode of a storage battery.

As shown in FIG. 1 and FIG. 4, the secondary coil module 20 receives supply of electric power via a primary coil 1 provided in the charging station side unit by the contactless power transfer technique, which power is to be used for charging the storage battery 30 having a metal case 31. According to the contactless power transfer technique, power from an AC power source to be supplied to the charging station side unit is transferred to a secondary coil 2 via the primary coil 1 provided in the charging station side unit to charge the storage battery 30, without any terminal contact between a primary coil module 10 provided in the charging station side unit and the secondary coil module 20 provided in the terminal side unit. Power transfer and reception between the primary coil 1 and the secondary coil 2 are effected by the electromagnetic induction. The secondary coil module 20 includes such secondary coil 2.

The secondary coil module 20 according to the instant embodiment includes the secondary coil 2, the storage battery 30 and a circuit board 41 mounting a power storage control circuit 40. The secondary coil 2 includes a core 21, a coil winding 22 and a lid member 23.

The core 21 includes a tubular portion 24 and a bottom portion 25 which are formed of magnetic material. The tubular portion 24 has a tubular or cylindrical form and its inner side defines an accommodation space 26 which accommodates the storage battery 30. The bottom portion 25 is formed integral with the tubular portion 24 in such a manner to close an opening of the tubular portion 24 at an end thereof in the axial direction. For this reason, the one end portion of the tubular portion 24 in the axial direction is opened, and the tubular portion 24 and the bottom portion 25 are formed like a cup, without forming any gap between the tubular portion 24 and the bottom portion 25. Specifically, such core 21 is formed of resin containing soft magnetic material. More particularly, the core 21 is formed by injection molding using such resin containing magnetic material. As such soft magnetic material, powder of Ni-based soft magnetic material or Mn-based soft magnetic material can be employed for example. Further, the resin material can be polyphenylene sulfide (PPS), epoxy resin, silicone resin, polyoxymethylene (POM), cycloolefin polymers (COP), polystyrene resin, ABS resin, AS resin, acrylic resin (PMMA), polybutylene terephthalate (PBT) resin, liquid crystal polymer (LCP), phenol resin, melamine resin, urea resin, unsaturated polyester resin, alkyd resin, polyurethane resin, polyimide resin, polyethylene resin, polypropylene resin, polystyrene resin, polysulfone resin, polyether sulfone resin, polyacrylate resin, aromatic polyether ketone resin, etc. With this, it is possible to form the core 21 having a radial thickness of 1 mm or less (preferably, a thickness ranging from 0.3 to 0.5 mm approximately) at its tubular portion 24.

The coil winding 22 is formed of conductive material and disposed on the outer side of the core 21 on the bottom portion 25 side of the core 21. As the conductive material, e.g. enameled wire can be used. In the instant embodiment, the coil winding 22 is configured such that the above enameled wire is wound in a spiral form to surround the tubular portion 24 of the core 21. The coil winding 22 can be constituted of winding of enameled wire by a plurality of turns directly around the outer circumferential face of the tubular portion 24. Alternatively, the coil winding 22 can be wound by a plurality of times to form an air core coil and the core 21 can be inserted to the radial inner side of this air-core coil. In either case, the coil winding 22 will be disposed with an offset toward the bottom portion 25 side of the core 21. A pair of terminal ends of the coil winding 22 (a winding start end and a winding finishing end) are connected to a pair of electrodes 42A, 42B of a coil connecting portion 42 (to be described later) provided in the lateral face of the core 21 (see FIG. 2).

The lid member 23 is formed of magnetic material and closes the other axial end portion of the tubular portion 24. The lid member 23 too can be formed of soft magnetic resin, like the core 21. Needless to say, it can also be any other material such as ceramic-based ferrite or amorphous type magnetic material, etc. The lid member 23 is provided in a form of a sheet using such magnetic material. The other axial end side of the tubular portion 24 noted above means one of the axial opposed end portions of the tubular portion 24 which end portion is different from the end portion where the bottom portion 25 is formed. The lid member 23 is formed into a shape in correspondence with the shape of the opening (the end portion where the bottom portion 25 is not formed) provided in the tubular portion 24. In the instant embodiment, a disc-like member is employed as this lid member 23. As such lid member 23 is bonded to the end portion of the tubular member 24, the opening portion of the core 21 can be capped. In this, a double-sided adhesive tape formed of magnetic material or an adhesive agent containing magnetic material will be used to eliminate any gap between the core 21 and the lid member 23.

The storage battery 30 includes the metal case 31 and a pair of terminal electrodes 32 formed of metal (a positive terminal and a negative terminal provided in the storage battery 30). The metal case 31 is used for covering the storage battery 30 and metal may be exposed or not exposed in the case 31. Although its shape is not particularly limited, as the storage battery 30 is to be accommodated in the accommodation space 26 of the tubular portion 24, the shape can be caused to comply with the shape of the accommodation space 26. When the storage battery 30 is to be accommodated in the accommodation space 26, the battery 30 can be affixed to the face of the bottom portion 25 facing the accommodation space 26 with using a double-sided adhesive tape 80. Since the storage battery 30 is configured to be enclosed within the core 21 as described above, the secondary coil module 20 can be formed compact. And, such storage battery 30 corresponds to e.g. a lithium polymer battery as a charging object by the contactless power transfer, which is charged by power supplied via the primary coil 1.

The power storage control circuit 40 is connected to the coil winding 22 and accommodated within the accommodation space 26 of the tubular portion 24 and controls charging of the storage battery 30. By electromagnetic induction, power is generated in the coil winding 22. This power is transferred to the power storage control circuit 40. The power storage control circuit 40 converts such power into a DC power of a predetermined voltage value suitable for charging of the storage battery 30.

Such power storage control circuit 40 is mounted on a circuit board 41. In the instant embodiment, this circuit board 41 is constituted by using a printed circuit board. To this circuit board 41, a coil winding connecting portion 42 formed by using flexible printed circuits (FPC), a storage battery connecting portion 43 and an output terminal forming portion 44 are solder-welded. Together with these components, i.e. the coil winding connecting portion 42, the storage battery connecting portion 43 and the output terminal forming portion 44, the circuit board 41 is disposed between the storage battery 30 and the inner wall of the tubular portion 24, and will be disposed within a column-like space, namely, the aforementioned accommodation space 26, formed by the core 21 and the lid member 23.

To the power storage control circuit 40 mounted on the circuit board 41, there is transferred via the coil winding connecting portion 42, power generated in the secondary coil 2 due to the electromagnetic induction. As shown in FIG. 2, at the coil winding portion 42, there are formed a pair of electrodes 42A, 42B to which the pair of end portions of the coil winding 22 described above are connected. The coil winding connecting portion 42 is bent at a predetermined position in the circuit board 41 and exposed in the surface of the core 21 (the outer circumferential face of the tubular portion 24). With this, the coil winding connecting portion 42 is exposed on the outer side of the core 21.

The storage battery connecting portion 43 is bent at a predetermined position in the circuit board 41 to be connected to one of the pair of terminal electrodes 32 of the storage battery 30. Further, though not shown, the other one of the pair of terminal electrodes 32 is also connected to the circuit board 41 with using e.g. a flexible printed circuit board, a conductive tape, etc. With this, the power generated in the secondary coil 2 can be stored via the power storage control circuit 40 in the storage battery 30.

The output terminal forming portion 44 is bent at a predetermined position in the circuit board 41 to be exposed on the outer side of the core 21. At the output terminal forming portion 44, there are formed a pair of output terminals 70 when bent to be exposed in the outer circumferential face of the core 21. These pair of output terminals 70 are connected via the storage battery connecting portion 43 to the pair of terminal electrodes 32 of the storage battery 30 and can output charged power to the storage battery 30. With this, power charged in the storage battery 30 can be readily taken out.

As shown in FIG. 4, in case the primary coil module 10 provided in the charging station side unit includes the primary coil 1 formed by winding the coil winding 12 about the core tubular portion 11, a magnetic flux is generated by the power supplied to the primary coil 1 along the axial direction of the tubular portion 11. Therefore, with arrangement of the secondary coil module 20 such that the above magnetic flux extends through the radial inner side of the secondary coil 2, the power by the magnetic induction can be transferred in an efficient manner to the secondary coil 2. Accordingly, in case the primary coil 1 is formed by winding the coil winding 12 around the tubular portion 11 of the core, the secondary coil module 20 will be disposed in such that the secondary coil 2 is positioned on the axis of the primary coil 1. With this, charging of the storage battery 30 is made possible.

Figure 5:
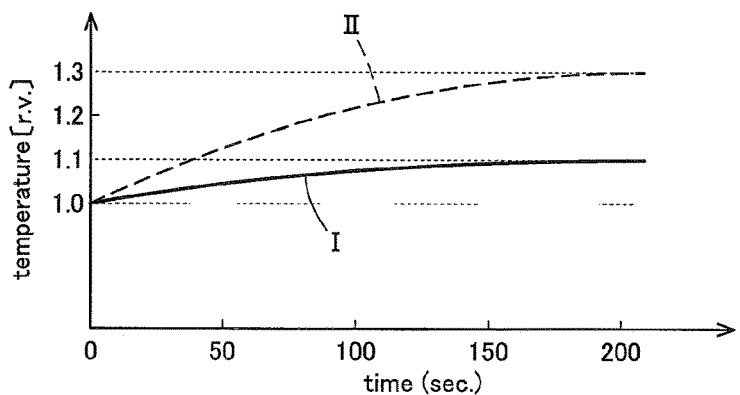
FIG. 5 is a view showing heat generation state of the storage battery.

FIG. 5 is a characteristics diagram showing change in the surface temperature of the storage battery 30 when this storage battery 30 is charged by the secondary coil module 20. The horizontal axis represents lapsed period from starting of charging, whereas the vertical axis represents a relative change relative to the temperature at the time of start of charging. The characteristics obtained when using the secondary coil module 20 relating to the instant embodiment is indicated with "I" in FIG. 5, whereas characteristics obtained when the core 21 is not provided is indicated with "II". As shown in FIG. 5, it has been found that by the arrangement of forming the tubular portion 24 and the bottom portion 25 integrally with each other so as not to form any gap therebetween at the time of forming the core 21, temperature rise after start of charging can be suppressed.

Other Embodiments

In the foregoing embodiment, it was explained that the coil winding 22 is wound in the spiral form to surround the tubular portion 24. Instead, the coil winding 22 can be wound in a swirl form. FIG. 6 shows a secondary coil module 20 using such coil winding 22. In this case, advantageously, the coil winding 22 can be placed on a protective film 33 formed of magnetic material and can be bonded to the outer face of the bottom portion 25 of the core 21 with a magnetic sheet with a double-sided adhesive tape 34. The coil winding 22 can be formed with patterning of a metal layer of the printed circuit board in a swirl form.

With such modified secondary coil module 20 described above also, as shown in FIG. 7, charging of the storage battery 30 is made possible by arranging the primary coil module 10 such that the coil winding 22 may be located on the axis of the primary coil 1.

Further, the coil winding 22 can be configured by serial connection of a spiral coil winding 22 and a swirl coil winding 22 to each other. Further alternatively, such spiral coil winding 22 and a swirl coil winding 22 can be connected in parallel with each other.

In the foregoing embodiment, it was explained that in the core 21, the other axial side end portion of the tubular portion 24 is closed by the lid member 23 formed of magnetic material. Instead, the core 21 can be configured such that the other axial side end portion of the tubular portion 24 is not closed by the lid member 23.

In the foregoing embodiment, it was explained that the core 21 is formed of resin containing soft magnetic material. Instead, the core 21 can be formed of other magnetic material than such soft magnetic material.

In the foregoing embodiment, it was explained that in the accommodation space 26, the power storage control circuit 40 for controlling charging of the storage battery 30 is also accommodated. Alternatively, the power storage control circuit 40 can be disposed outside the core 21, rather than being accommodated in the accommodation space 26.

In the foregoing embodiment, it was explained that the storage battery 30 includes the metal case 31 and the pair of terminal electrodes 32 formed of metal. In this regard, it should be noted that it will suffice if at least one of the case 31 and the terminal electrodes 32 is/are formed of metal. In such case too, although there is the possibility of heat generation in the storage battery 30 due to eddy current due to leakage magnetic flux, heat generation can be suppressed by the inventive secondary coil module 20 above.

INDUSTRIAL APPLICABILITY

The present invention can be used in a secondary coil module which receives supply of electric power via a primary coil by contactless power transfer technique.

DESCRIPTION OF REFERENCE MARKS/NUMERALS

1: primary coil
20: secondary coil module
21: core
22: coil winding
23: lid member
24: tubular portion
25: bottom portion
26: accommodation space
31: case
30: storage battery
40: power storage control circuit

The invention claimed is:

1. A secondary coil module receiving supply of electric power via a primary coil by contactless power transfer technique, the secondary coil module comprising:
   a core formed of magnetic material, the core having a tubular portion in the form of a tube and a bottom portion formed integral with the tubular portion in such a manner as to close an opening of the tubular portion formed at one axial end portion thereof;
   a storage battery accommodated within an accommodation space provided inside the tubular portion and configured to be charged by the power; and
   a coil winding disposed outside the core and on the side of the bottom portion of the core, wherein
   the core is formed of resin containing soft magnetic material, and
   formation of a gap between the tubular portion and the bottom portion is avoided.

2. The secondary coil module of claim 1, wherein the other axial end portion of the tubular portion of the core is opened, which other axial end portion in turn is closed with a lid member formed of magnetic material.

3. The secondary coil module of claim 2, wherein the coil winding is wound in a spiral form to surround the tubular portion.

4. The secondary coil module of claim 3, wherein the coil winding is wound in a swirl form and disposed in opposition to the bottom portion of the core.

5. The secondary coil module of claim 3, wherein the accommodation space further accommodates a power storage control circuit for controlling charging of the storage battery.

6. The secondary coil module of claim 2, wherein the coil winding is wound in a swirl form and disposed in opposition to the bottom portion of the core.

7. The secondary coil module of claim 2, wherein the accommodation space further accommodates a power storage control circuit for controlling charging of the storage battery.

8. The secondary coil module of claim 1, wherein the coil winding is wound in a spiral form to surround the tubular portion.

9. The secondary coil module of claim 8, wherein the coil winding is wound in a swirl form and disposed in opposition to the bottom portion of the core.

10. The secondary coil module of claim 8, wherein the accommodation space further accommodates a power storage control circuit for controlling charging of the storage battery.

11. The secondary coil module of claim 1, wherein the coil winding is wound in a swirl form and disposed in opposition to the bottom portion of the core.

12. The secondary coil module of claim 1, wherein the accommodation space further accommodates a power storage control circuit for controlling charging of the storage battery.

13. The secondary coil module of claim 1, additionally comprising
   a circuit board situated between the storage battery and an inner wall of the tubular portion within the accommodation space, and
   a coil winding connecting portion, a storage battery connecting portion and an output terminal forming portion all being electrically connected to the circuit board,
   the coil winding portion comprising a pair of electrodes connected to respective ends of the coil winding,
   the coil winding portion being bent to be exposed on an outer surface of the core or tubular portion thereof,
   the storage battery connecting portion being connected to one of a pair of terminal electrodes of the storage battery,
   the output terminal forming portion comprising output terminals, and
   the output terminal forming portion being bent to be exposed on the outer surface of the core or tubular portion thereof and connected via the storage battery connecting portion to the pair of terminal electrodes of the storage battery.

* * * * *